(12) United States Patent
Lewis et al.

(10) Patent No.: US 7,363,304 B2
(45) Date of Patent: *Apr. 22, 2008

(54) METHOD AND SYSTEM FOR PROVIDING A HARDWARE SORT FOR A LARGE NUMBER OF ITEMS

(75) Inventors: Michael C. Lewis, San Jose, CA (US); Aleksandr Movshovich, Santa Clara, CA (US)

(73) Assignee: Broadcom Corporation, Irvine, CA (US)

( * ) Notice: Subject to any disclaimer, the term of this patent is extended or adjusted under 35 U.S.C. 154(b) by 401 days.

This patent is subject to a terminal disclaimer.

(21) Appl. No.: 10/882,035

(22) Filed: Jun. 29, 2004

(65) Prior Publication Data

US 2005/0004912 A1 Jan. 6, 2005

Related U.S. Application Data

(63) Continuation of application No. 09/590,772, filed on Jun. 8, 2000, now Pat. No. 6,775,667.

(60) Provisional application No. 60/201,033, filed on May 1, 2000.

(51) Int. Cl.
*G06F 17/30* (2006.01)
*G06F 15/00* (2006.01)
*G06F 17/50* (2006.01)

(52) U.S. Cl. ............................. 707/7; 712/14; 716/14

(58) Field of Classification Search .................... 707/1, 707/9, 7; 716/1, 12, 14, 16, 17; 712/1, 10, 712/11, 14, 15; 345/418; 382/100
See application file for complete search history.

(56) References Cited

U.S. PATENT DOCUMENTS

| | | | |
|---|---|---|---|
| 4,030,077 | A | 6/1977 | Florence et al. |
| 4,499,555 | A | 2/1985 | Huang |
| 5,125,074 | A | 6/1992 | Labeaute et al. |
| 5,621,908 | A | 4/1997 | Akaboshi et al. |
| 6,035,296 | A | 3/2000 | Fushimi |

OTHER PUBLICATIONS

G. Liu et al., Parallel Merge Module for Combining Sorted Lists, IEEE Proceedings, May 1989, No. 3, part E, pp. 161-165.

(Continued)

*Primary Examiner*—Uyen Le
(74) *Attorney, Agent, or Firm*—McAndrews, Held & Malloy, Ltd.

(57) ABSTRACT

A method and system for sorting a number of items in a computer system. The sort is based on a plurality of values of a key. Each item has a value of the plurality of values. The method and system include providing plurality of stages, providing at least one switch coupled between the plurality of stages, and providing a final switch coupled with a last stage. Each of the plurality of stages has a pair of first-in-first-out buffers (FIFOs) that store twice as many of the items as the pair of FIFOs in a previous stage. Each switch is for merging and sorting a first portion of the number of items from the pair of FIFOs in the previous stage based on the key and for providing the first portion of the number plurality of items to a first FIFO of the pair of FIFOs of the stage in order. Each switch is also for merging and sorting a second portion of the number of items the pair of FIFOs in the previous stage based on the key and providing the second portion of the number plurality of items to a second FIFO of the pair of FIFOs of the stage in order. The last switch is for merging and sorting a third portion of the number of items to provide the number of items in order.

19 Claims, 7 Drawing Sheets

OTHER PUBLICATIONS

G. Miranker et al., A "Zero-Time" VLSI Sorter, IBM Journal of Research and Development, vol. 27, No. 2, Mar. 1983, pp. 140-148.

V. Meyer et al., A Data-reducing Transform Codec with Variable Output Rate and Activity-controlled Channel Adaptation, Frequenz 44, No. 7-8, 1990 pp. 209-216.

T. Eldos et al., *A Functional Memory Based Architecture for Running Sorting,* Fifth International Symposium on Signal Processing and Its Applications, ISSPA 1999, pp. 705-708.

S. Kamiya et al., A Hardware Pipeline Algorithm for Relational Database Operation and Its Implementation Using Dedicated Hardware, IEEE 1985, pp. 250-257.

METHOD AND SYSTEM FOR PROVIDING A HARDWARE SORT FOR A LARGE NUMBER OF ITEMS

CROSS-REFERENCE TO RELATED APPLICATIONS

This application is a continuation of U.S. patent application Ser. No. 09/590,772 filed Jun. 8, 2000 (now U.S. Pat. No. 6,775,667), which claims priority to Provisional U.S. Patent Application Ser. No. 60/201,033, filed May 1, 2000, and is related to U.S. patent application Ser. No. 09/062,872 entitled "Method and System for Providing a Hardware Sort in a Graphics System," filed on Apr. 20, 1998 (now abandoned).

FIELD OF THE INVENTION

The present invention relates to computer systems, and more particularly to a method and system for providing a hardware sort which is efficient and applicable to computer graphics system.

BACKGROUND OF THE INVENTION

Many computer systems must sort items based on the value of a key in order to achieve certain functions. Many such computer systems conventionally employ a software sort. For example, computer graphics systems may utilize a software sort in order to render an image. In current computer graphics systems, images of three-dimensional objects can be depicted on a two-dimensional display. The display typically includes a number of pixels arranged in a grid. To render an image, the image is typically broken into polygons. Each polygon may cover one or more pixels in the display. In order to give the illusion of depth, computer graphics systems use each polygon's "z value," the distance of each polygon to the viewing plane. In particular, the polygons are ordered based on each polygon's z value. Thus, the key for such a sort is the z value. Once the polygons are sorted according to their z values, the computer graphics system can correctly blend the colors of translucent polygons and opaque polygons that can be seen through the translucent polygons to achieve the proper color to be displayed for each pixel.

In a conventional computer graphics system, the software sort occurs when a display list is generated through an application. The display list orders portions of three-dimensional objects, i.e. polygons, based on a key, typically the z value. The display list typically orders translucent polygons from back to front. Thus, the display list sorts translucent polygons. Although they may appear on the display list, opaque polygons are typically sorted using a conventional Z buffer.

Placing the polygons in the order prescribed by the display list allows the computer system to properly depict the images of the three-dimensional objects on the display. Hardware in the computer graphics system utilizes the display list, a frame buffer, and a z buffer to render the three-dimensional objects in the order dictated by the display list. The frame buffer and z buffer describe a portion of the three-dimensional object that is to be rendered. The frame buffer includes data such as color and alpha values for the polygon, while the z buffer includes the corresponding z values. The conventional computer graphics system provides the polygons described in the frame and z buffers to the display screen in the order prescribed by the display list. Thus, the display list generated by software is used to render the three-dimensional objects.

Although conventional computer graphics systems are capable of depicting three-dimensional objects, the software sort that generates the display list can be relatively slow. If the software sort is optimized, the sort time can be reduced to a limited extent. However, development time for the software sort is significantly increased. Moreover, changes to the display list and the software sort creating the display list may be difficult to implement. Finally, since the hardware requires a display list in order to properly render the objects, the computer system is limited to using those applications which provide a sorted display list. Without the display list and the attendant software sort, the computer system may not be able to properly depict three-dimensional objects.

A method and system for performing a hardware sort is described in co-pending U.S. patent application Ser. No. 09/062,872 entitled "Method and System for Providing a Hardware Sort in a Graphics System" filed on Apr. 20, 1998 and assigned to the assignee of the present application. Applicants hereby incorporate by reference the above-mentioned co-pending patent application. The hardware sort described in the above-mentioned co-pending application can be used to sort polygons for rendering on a display.

FIG. 1 is a block diagram of one embodiment of a hardware sorter 10 described in the above-mentioned co-pending application. The hardware sorter 10 is used by a computer graphics system which preferably renders a graphical image pixel-by-pixel. However, the system 10 can be used in another computer system for other purposes or in a computer graphics system which does not render an image pixel-by-pixel. The hardware sorter 10 sorts based on a particular key associated with a particular item. The key value is the z-value for a fragment. The fragment for a particular polygon includes data for the portion of the polygon that intersects a particular pixel. Such a polygon is termed an intersecting polygon for the particular pixel. More than one intersecting polygon can intersect a particular pixel. Although the hardware sorter 10 is described as sorting based on a z value, nothing prevents the hardware sorter 10 from sorting based on another key or accepting other types of data. Thus, the hardware sorter 10 is applicable to other systems requiring a sort, such as a router in a network.

The hardware sorter 10 includes a plurality of sort cells 11. Note that although only four sort cells 11 are depicted, nothing prevents the hardware sorter 10 from having another number of sort cells 11. In an embodiment disclosed in the above-mentioned co-pending application, the number of sort cells 11 is at least equal to the number of items to be sorted. Thus, in one embodiment, the number of sort cells 11 is the same as the number of processors which are used to process the fragments for intersecting polygons of a particular pixel in parallel. As disclosed in the above-mentioned co-pending application, the number of sort cells is typically sixteen. However, nothing prevents the use of another number of sort cells 11.

The hardware sorter 10 further includes a new input line 12 for providing a new fragment in parallel to each of the sort cells 11 via new input 12. Each sort cell 11 also includes an output 13. The output 13 of a sort cell 11 is coupled to an input of a next sort cell 11. The output 13 of the last sort cell 11 is not coupled to another sort cell 11. Instead, the output 13 of the last sort cell 11 provides the output of the hardware sorter 10.

The hardware sorter 10 generally functions as follows. Each sort cell 11 may have a fragment which corresponds to it ("corresponding fragment"). Each corresponding fragment includes a corresponding z value, which is used to sort the fragment, and corresponding data, such as color and alpha values for the corresponding fragment. A new fragment, including the new z value, is broadcast to each of the plurality of sort cells 11. Generally, if the new fragment is the first fragment for a pixel, the first fragment is also placed in the first sort cell 11. Where the new fragment is a first fragment for a pixel when the hardware sorter 10 is empty, the first fragment is placed in the first sort cell 11. This may be accomplished by indicating that data in other sort cells 11 is invalid.

The new z value for the new fragment is compared to the corresponding z value in each sort cell 11. Preferably, this function is accomplished using a comparator (not shown). Based on this comparison, each sort cell 11 retains the corresponding fragment, accepts the new fragment, or accepts the fragment corresponding to a previous sort cell 11. If the corresponding fragment is to be retained, then the sort cell 11 keeps the corresponding fragment. If the corresponding fragment is not to be retained, then it is determined whether the sort cell 11 is to take the fragment corresponding to a previous sort cell 11. If the sort cell 11 is to accept this fragment, the sort cell 11 takes the fragment corresponding to the previous cell and passes its corresponding fragment to be accepted by the next sort cell 11. If the corresponding fragment from the previous sort cell 11 is not to be taken by the sort cell 11, the sort cell 11 takes the new fragment and passes its corresponding fragment to be accepted by the next cell. As a result, the new fragment is inserted into the hardware sorter 10 in the appropriate sort cell 11. This process continues to sort all of the fragments provided to the hardware sorter.

For example, the corresponding fragment may be retained by a sort cell 11 if the corresponding z value for the corresponding fragment is greater than the new z value for the new fragment. The sort cell 11 which accepts the new fragment passes its corresponding fragment to the next sort cell 11. Sort cell(s) 11 which are higher (before) the sort cell 11 accepting the new fragment remain unchanged. The next sort cell 11 receives the corresponding fragment from the previous cell and passes its own corresponding fragment to a next cell in the sorter 10. This occurs even if the z value for the corresponding fragment in the next sort cell 11 is less than the new z value. As a result, the fragments are ordered from lowest to highest z-value by the hardware sorter 10.

Although the hardware sorter 10 functions, one of ordinary skill in the art will realize that the hardware sorter 10 is efficient for sorting only a relatively small number of items. When the number of items grows large, for example beyond approximately 64 items, the hardware sorter 10 becomes costly. In particular, each sort cell is of moderate cost. Using only a few sort cells, for example between eight and sixteen cells, yields an acceptable cost to the system. However, sorting more items multiplies the cost in a linear fashion. Thus, the cost becomes unacceptable cost for larger numbers of items, for example 1024 items. Consequently, for larger numbers of items to be sorted, a different sorting mechanism is desired.

One conventional mechanism for allowing the hardware sorter 10 to sort a larger number of items is to use a number of hardware sorters 10 in parallel, then to sort and combine the results of the hardware sorters 10. For example, suppose that a maximum of two hundred and fifty-six items is to be sorted and that each hardware sorter 10 can sort sixteen items. In such a case, sixteen hardware sorters 10 could be operated in parallel. The output of each hardware sorter 10 would be sorted. However, the outputs of one hardware sorter 10 would not be sorted with respect to the output of another hardware sorter 10. Thus, the outputs of the hardware sorters 10 would then be sorted to provide all of the up to two hundred and fifty-six items in order.

Although operating a number of hardware sorters 10 in parallel could provide a hardware sort of a larger number of items, one of ordinary skill in the art will readily realize that such a system would be inefficient. Although each hardware sorter 10 is efficient, multiple hardware sorters 10 would require a large number of gates and consume a relatively large amount of space on a chip. Consequently, implementing a number of hardware sorters 10 in parallel may be an inefficient use of silicon.

Another conventional mechanism for allowing the hardware sorter 10 to sort a larger number of items would be to provide a conventional tree of first-in-first-out buffers ("FIFOs"). FIG. 2 depicts a block diagram of such a conventional tree 18 coupled to a hardware sorter 10. For example, suppose a maximum of two hundred and fifty six items were to be sorted. Also suppose that the hardware sorter 10 can efficiently sort sixteen items. The first stage 20 in the conventional tree 18 would include sixteen FIFOs 22, with each FIFO 22 capable of holding sixteen items. Each time the hardware sorter 10 completed sorting sixteen of the possible two hundred and fifty six items, the hardware sorter 10 would provide the sixteen items to one of the FIFOs 22 in the first stage 20. Thus, the contents of each of the FIFOs 22 in the first stage 20 would be sorted. In the second stage 30 of the conventional tree 18, eight FIFOs 32, each capable of holding thirty-two items, would be provided. Each FIFO 32 in the second stage 30 would receive inputs from two FIFOs 22 in the first stage 20. The contents of the two FIFOs 22 in the first stage would be sorted prior to being combined in the FIFO 32 in the second stage 30. Thus, the contents of each of the FIFOs 32 in the second stage 30 would also be sorted. The third stage 40 of the conventional tree 18 would contain four FIFOs 42, each capable of holding sixty-four items. The fourth stage 50 of the conventional tree 18 would contain two FIFOs 52, each capable of holding one hundred and twenty-eight items. The final stage 60 of the conventional tree 18 would hold one FIFO 62 capable of holding two hundred and fifty-six items. Between each stage 30, 40, 50 and 60, the contents of two FIFOs of the previous stage 20, 30, 40 and 50 would be sorted and combined. Thus, the contents of each FIFO in each stage are sorted. Before the fifth stage 60, the contents of the two FIFOs 52 in the fourth stage 50 are sorted and combined in order in the FIFO 62 of the fifth stage 60. Consequently, the last FIFO 62 of the conventional tree 18 holds all two hundred and fifty-six items in the desired order.

Although the conventional tree 18 can provide a hardware sort of a higher number of items, one of ordinary skill in the art will readily realize that the conventional tree 18 is not an efficient implementation of a sort. In particular, a FIFO which contains a smaller number of items, such as a FIFO 22, is not efficient. Each FIFO has a set overhead that is relatively independent of the size of the FIFO. This overhead takes up a larger portion of the FIFO for smaller FIFOs. The number of items that the FIFOs in the conventional tree 18 can hold grows geometrically from the initial number of items to be sorted, which could be as low as one. Consequently, the FIFOs in the early stages of the conventional tree 18 are relatively inefficient.

Accordingly, what is needed is a more efficient system and method for sorting items which does not require a sort performed by software. It would also be beneficial if the system and method could be implemented in a computer graphics system for providing a two dimensional image of three-dimensional objects. The present invention addresses such a need.

SUMMARY OF THE INVENTION

The present invention provides a method and system for sorting a number of items in a computer system. The sort is based on a plurality of values of a key. Each item has a value of the plurality of values. The method and system comprise providing a plurality of stages, providing at least one switch coupled between the plurality of stages, and providing a final switch coupled to a last stage of the plurality of stages. Each of the plurality of stages has a pair of first-in-first-out buffers (FIFOs). The pair of FIFOs in a stage of the plurality of stages stores twice as many of the number of items as the pair of FIFOs in a previous stage of the plurality of stages. Each of the at least one switch is for merging and sorting a first portion of the number of items from the pair of FIFOs in the previous stage based on the key and providing the first portion of the number plurality of items to a first FIFO of the pair of FIFOs of the stage in order. Each of the at least one switch is also for merging and sorting a second portion of the number of items the pair of FIFOs in the previous stage based on the key and providing the second portion of the number plurality of items to a second FIFO of the pair of FIFOs of the stage in order. The final switch is for merging and sorting a third portion of the number of items to provide the number of items in order.

According to the system and method disclosed herein, the present invention provides a more efficient hardware sort.

DETAILED DESCRIPTION OF THE INVENTION

Figure 1:
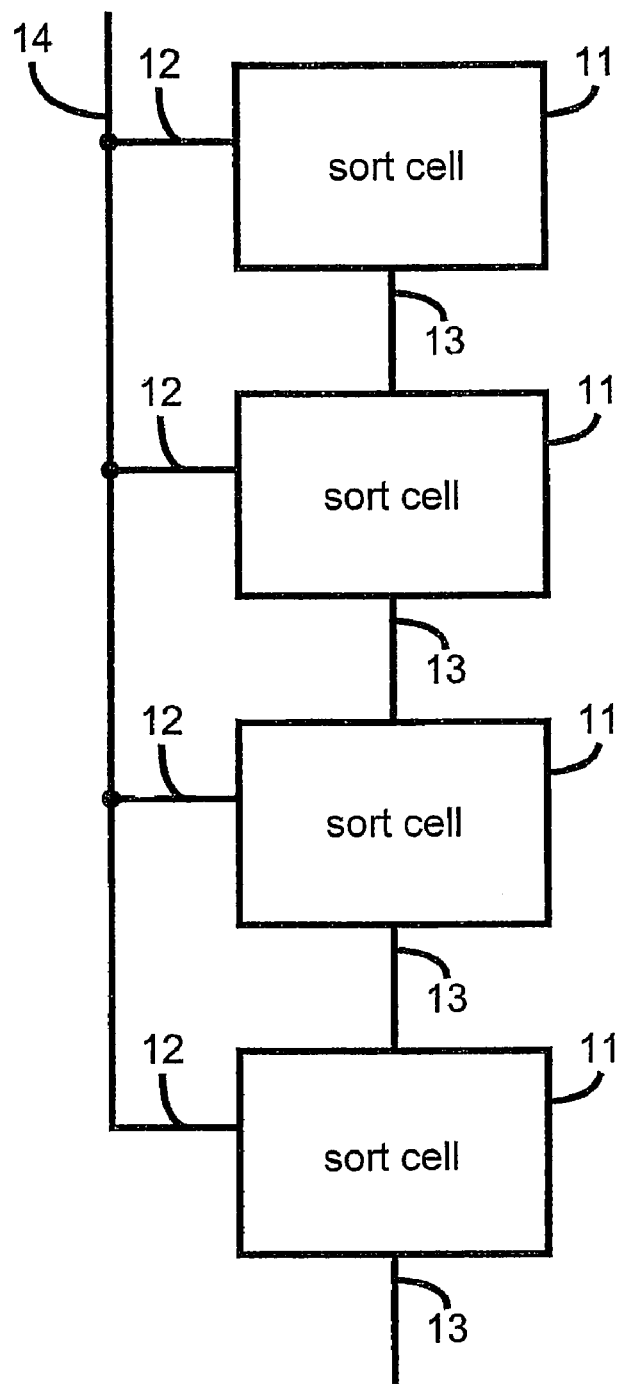
FIG. 1 is a block diagram of one embodiment of a system for performing a hardware sort described in a co-pending U.S. patent application.

The present invention relates to an improvement in hardware sorts in a computer system, particularly a computer graphics system. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

Conventional computer graphics systems typically provide a software sort in order to provide a display list used in rendering graphical images. Although a software sort can be used in generating graphical images, the software sort may be relatively slow. Although the software sort can be optimized to a limited extent, optimization typically complicates development and may not result in a significant improvement in efficiency.

The above-mentioned co-pending patent application describes a hardware sorter which can efficiently provide a hardware sort for a number of items. Consequently, the hardware sorter can be used in sorting items for a graphical display. Although the hardware sorter described in the above-mentioned co-pending patent application works well for its intended purpose, the number of items which the hardware sorter can efficiently sort is limited. Furthermore, conventional mechanisms for allowing the hardware sorter to be used in sorting a large number of items are also inefficient.

Thus, it is desired to sort a high number of items. In other words, it would be desirable to have a high-throughput sort. In particular, if N items to be sorted are presented in a stream having one item per cycle over N cycles, it would be desirable to be able to sort the N items in N cycles. It is also desirable to output items one item per cycle over N cycles, but with items being output in sorted order. It would also be desirable to sort a continuous stream of packets of $N_i$ items each, where $N_i$ is always-guaranteed to be less than or equal to a certain maximum number ($N_{max}$), but which can vary from packet to packet. The latency of the system may be arbitrarily high, but it is desired that it be as low as possible. The present invention is capable of performing these functions.

The present invention provides a method and system for sorting a number of items in a computer system. The sort is based on a plurality of values of a key. Each item has a value of the plurality of values. The method and system comprise providing a plurality of stages, providing at least one switch coupled between the plurality of stages, and providing a final switch coupled to a last stage of the plurality of stages. Each of the plurality of stages has a pair of first-in-first-out buffers (FIFOs). The pair of FIFOs in a stage of the plurality of stages stores twice as many of the number of items as the pair of FIFOs in a previous stage of the plurality of stages. Each of the at least one switch is for merging and sorting a first portion of the number of items from the pair of FIFOs in the previous stage based on the key and providing the first portion of the number plurality of items to a first FIFO of the pair of FIFOs of the stage in order. Each of the at least one switch is also for merging and sorting a second portion of the number of items the pair of FIFOs in the previous stage based on the key and providing the second portion of the number plurality of items to a second FIFO of the pair of FIFOs of the stage in order. The final switch is for merging and sorting a third portion of the number of items to provide the number of items in order.

The present invention will be described in terms of a particular computer system used for generating graphical images. However, one of ordinary skill in the art will readily recognize that this method and system will operate effectively for other computer systems and other functions for which a sort is used. Furthermore, the present invention is described in the context of a particular initial sorter. However, one of ordinary skill in the art will readily realize that the present invention is consistent with the use of other initial sorters. For example, an initial sorter having more gates but a higher clock speed than the initial sorter could be used.

Figure 3A:
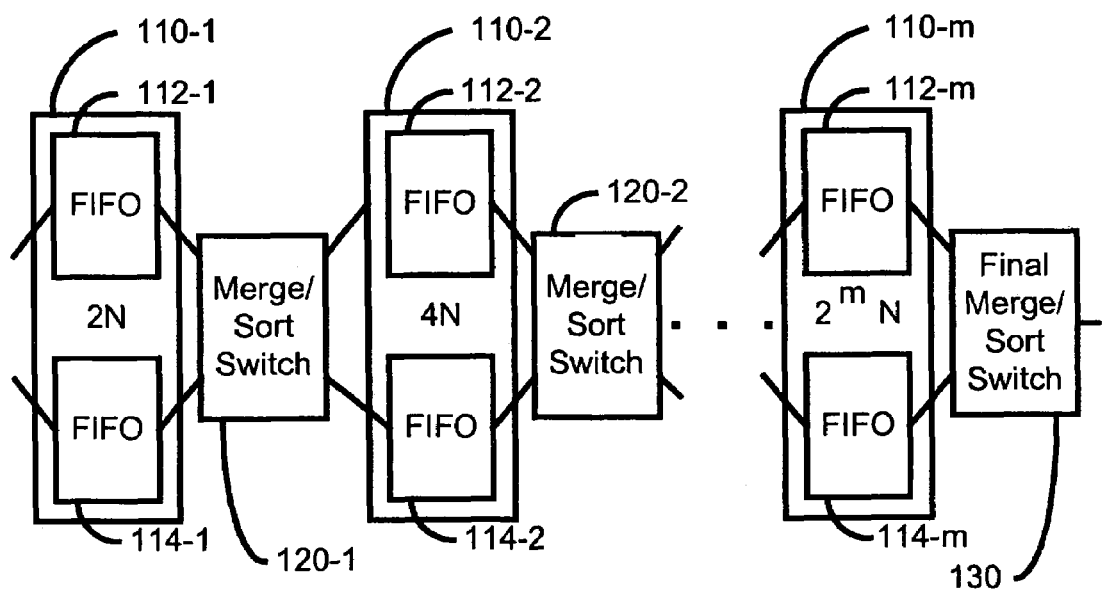
FIG. 3A is a block diagram of one embodiment of a system for performing a hardware sort in accordance with the present invention.

To more particularly illustrate the method and system in accordance with the present invention, refer now to FIG. 3A, depicting one embodiment of system 100 for performing a hardware sort in accordance with the present invention. The system 100 includes stages 110-1, 110-2, through 110-$m$. Each stage 110 has a pair of first-in-first-out buffers ("FIFOs") 112 and 114. Each FIFO of the pair of FIFOs 112 and 114 in a stage 110 preferably can store the same number of items. For example, the FIFOs 112-1 and 114-1 each can hold N items. The FIFOs 112-2 and 114-2 in the second stage can each store up to 2N items. The FIFOs 112-$m$ and 114-$m$ in the final stage each can each hold up to $2^m*N$ items. Thus, the number of items that can be stored in a FIFO 112 or 114 of a stage 110 grows by a factor of two from a preceding stage. The items initially provided to a FIFO 112-1 or 114-1 of the first stage 110-1 should be sorted. For example, N is greater than one, the N items provided to FIFO 112-1 should be sorted with respect to each other. Similarly, the N items provided to the FIFO 114-1 should be sorted with respect-to each other. However, there is no requirement that the items provided to the FIFO 112-1 be sorted with respect to the N items provided to the FIFO 114-1.

Between the stages 110 are merge/sort switches 120. Thus, the merge/sort switch 120-1 is between the first stage 110-1 and the second stage 110-2. The second merge/sort switch 120-2 is between the second stage 110-2 and a third stage (not explicitly shown). A final, m−1, merge/sort switch (not shown) precedes the final stage 110-$m$. Each merge/sort switch 110 merges the maximum number of items that can be stored in the FIFOs 112-$i$ and 114-$i$ of a previous stage 110-$i$ and provides groups of the sorted items to alternatively to the FIFOs 112-($i$+1) and 114-($i$+1) of the next stage 110-($i$+1). Thus, each FIFO 112 or 114 holds items which are sorted with respect to each other. However, the items provided to one FIFO 112 or 114 may not be sorted with respect to the items provided to the other FIFO 114 or 112, respectively.

Figure 3B:
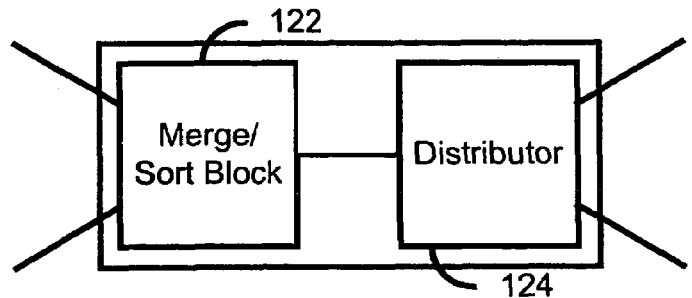
FIG. 3B is a more detailed block diagram of a merge/sort switch in accordance with the present invention.

FIG. 3B depicts a more detailed block diagram of a merge/sort switch 120. The merge sort switch 120 includes a merge/sort block 122 and a distributor 124. The merge/sort block 122 merges the contents of two FIFOs 112 and 114 from the previous stage and ensures that the merge contents are sorted in order. The distributor 124 distributes the output of the merge/sort block to the two FIFOs 112 and 114 in the next stage. The distributor provides groups of sorted items alternatively to the FIFOs 112 and 114 in the next stage. Thus, the distributor 124 ensures that $2^i*N$ items in a group are provided to the FIFO 112-$i$ of the $i^{th}$ stage, while the next $2^i*N$ items in a next group are provided to the FIFO 114-$i$ of the $i^{th}$ stage. Consequently, the contents of each FIFO 112 and 114 in a stage are sorted with respect to each other.

Referring back to FIG. 3A, a final switch 130 merges and sorts the items from the final stage 110-$m$ and outputs the items. Thus, the final switch 130 preferably merely includes a merge/sort block, such as the merge/sort block depicted in FIG. 3B.

Figure 4:
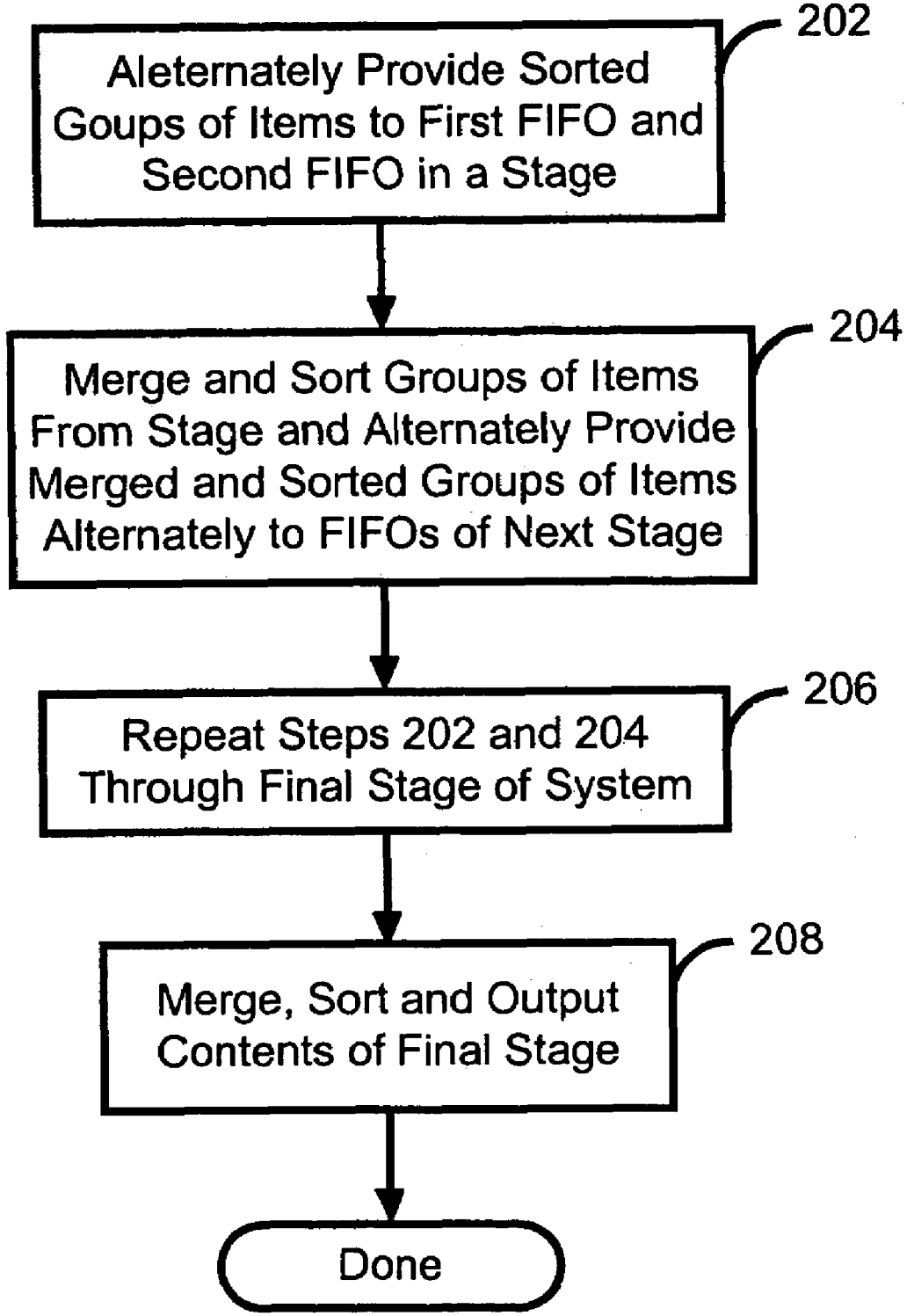
FIG. 4 is a flow chart of one embodiment of a method for performing a hardware sort in accordance with the present invention.

FIG. 4 depicts a high-level flow chart of a method 200 for performing a hardware sort using the system 100. A number of items are provided alternatively to the FIFOs 112 and 114 in a stage, via step 202. The first time that step 202,is performed, groups of N sorted items are alternatively provided to the FIFO 112-1 and 112-2. The items from the stage are then merged, sorted, and provided in groups alternatively to the FIFOs 112 and 114 of the next stage, via step 204. The groups are set so that one of the FIFOs 112 or 114 in the next stage is filled with a group of sorted items before items are provided to the other FIFO 114 or 112, respectively. Thus, step 204 ensures that the items in the FIFOs 112 and 114 remain sorted with respect to each other. However, the items in one FIFO 112 or 114 need not be sorted with respect to the items in the other FIFO 114 or 112, respectively. Furthermore, step 204 can be started before both FIFOs 112 and 114 of the previous stage are filled. In a preferred embodiment, step 204 is commenced after the first FIFO 112 is filled, when at least one item is provided to the second FIFO 114 of the stage. However, if fewer items are provided for sorting, then step 204 may start earlier. Thus, delays in providing items to the next stage in the system 100 are reduced.

Steps 202 and 204 are then repeated, via step 206, through the final stage 110-$m$ is filled. In a preferred embodiment, a stage is refilled in step 202 while the stage is being emptied in step 204. Consequently, the pipeline for the system can remain full. A final merge and sort is then performed on the contents of the final stage 110-$m$, via step 208, to provide the number of items desired to be sorted in the desired order. Portions of steps 202 through 208 are preferably performed concurrently to improve the efficiency of the system 100.

For example, the FIFOs 112-1 and 114-1 are capable of holding a total of 2N items. When at least the FIFO 112-1 or 114-1 is filled and an item is to be provided to the other FIFO 114-1 or 112-1, respectively, a merge and sort of the first stage 110-1 may commence. Thus, the merge/sort switch 120-1 provides 2N sorted items from the first stage 110-1 to a FIFO 112-2 in the second stage, as in step 204. Thus, the merge/sort switch preferably commences this task as soon as it can, when the first item is provided to the second FIFO 114-1. The FIFOs 112-1 and 114-1 may still continue to receive groups of sorted items. The next 2N items from the first stage 110-2 are merged and sorted by the merge/sort switch 120-1 and provided to the FIFO 114-2 in the second stage. The second merge/sort switch 120-2 merges and sorts 4N items from the FIFOs 112-2 and 114-2 and provides these items to a first FIFO (not explicitly shown in FIG. 3) of the next stage (not explicitly shown in FIG. 3). This process of merging and sorting more and more items from stages continues until the final stage 110-$m$. The $2^m*N$ items from the two FIFOs 112-$m$ and 114-$m$ are merged and sorted, then output by a final switch 130. Consequently, a hardware sort can be provided.

Figure 5:
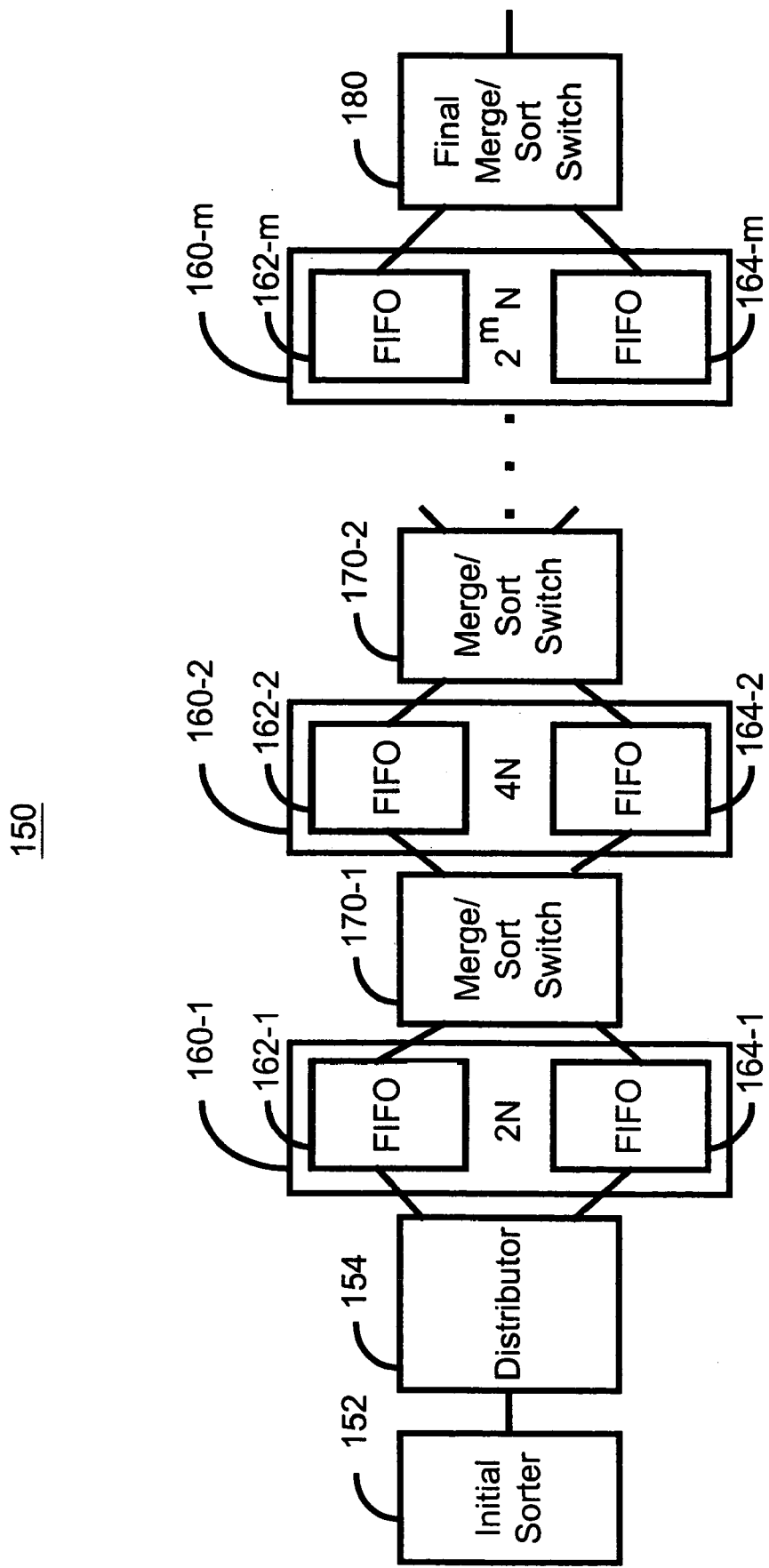
FIG. 5 is a block diagram of a second embodiment of a system for performing a hardware sort in accordance with the present invention.

FIG. 5 depicts a more detailed block diagram of a preferred embodiment of a system 150 in accordance with the present invention. The system 150 includes an initial sorter 152 coupled to a distributor 154. The system 150 also includes stages 160-1, 160-2 through 160-$m$. Each stage 160 includes a pair of FIFOs 162 and 164. Thus, the stage 160-1 includes FIFOs 162-1 and 164-1. Between the stages are merge/sort switches 170. After the final stage, a final merge/sort switch 180 is provided. The stages 160 correspond to the stages 110. The merge/sort switches 170 correspond to the merge/sort switches 120. Consequently, the merge/sort switches 170 each preferably includes a merge/sort block 122 and a distributor 124, as depicted in FIG. 3B. Referring back to FIG. 5, the final merge/sort switch 180 corresponds to the final merge/sort switch 130. Consequently, the final merge/sort switch 180 merely merges and sorts items from the FIFOs 112-$m$ and 114-$m$ and provides an output.

The system 150 functions similarly to the system 100. The initial sorter 152 is capable of sorting a smaller number of items, preferably up to N items. In a preferred is embodiment, the initial sorter 152 is made up of the hardware sorter 10 shown in FIG. 1. Also in a preferred embodiment, N is between four and sixteen. However, referring back to FIG. 5, another mechanism for the initial sorter 152 and another number for N can be used. The initial sorter 152 merely sorts a smaller number of items than the system 150 is capable of sorting. Moreover, in an alternate embodiment, where N=1, the initial sorter 152 may be omitted. The distributor 154 distributes the N items sorted by the initial sorter 152 alternatively to the FIFOs 162-1 and 164-1 in the first stage 160-1. For example, if more than 2N items are to be sorted, the first N items sorted would be sorted by the initial sorter 152 and provided to the FIFO 162-1. The second N items would be sorted by the initial sorter 152 and provided to the other FIFO 164-1. This process of sorting groups of up to N items and alternatively distributing the groups to the FIFOs 162-1 and 164-1 would be continued until all items in a particular data stream were sorted.

Figure 6:
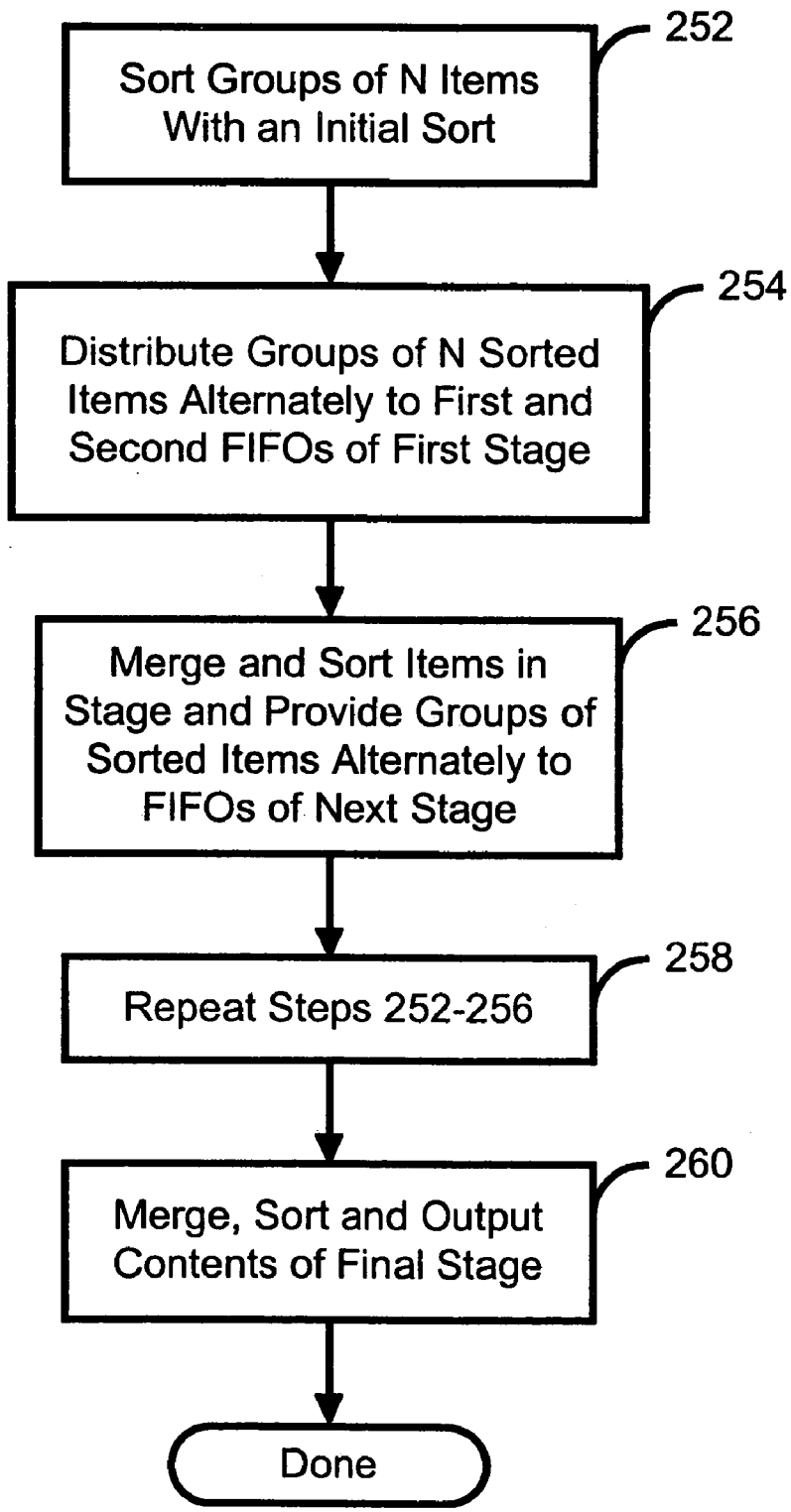
FIG. 6 is a flow chart of a second embodiment of a method for performing a hardware sort in accordance with the present invention.

FIG. 6 depicts one embodiment of a method 250 for performing a hardware sort utilizing the system 150. Groups of items are sorted in initial sorts, via step 252. The groups of sorted items are distributed alternatively to the FIFOs 162-1 and 164-1 of the first stage, via step 254. The items from the stage are then merged, sorted, and provided in groups alternatively to the FIFOs 162 and 164 of the next stage, via step 256. The groups are set so that one of the FIFOs 162 or 164 in the next stage is filled with a group of sorted items before items are provided to the other FIFO 164 or 162, respectively. Also in step 256, the stage of the pipeline whose contents are being merged and sorted may be refilled with the merged and sorted contents of a previous stage or, for the first stage, the contents of the distributor 154. Thus, step 256 ensures that the items in the FIFOs 162 and 164 remain sorted with respect to each other. However, the items in one FIFO 162 or 164 need not be sorted with respect to the items in the other FIFO 164 or 162, respectively. Furthermore, step 256 can be started before both FIFOs 162 and 164 of the previous stage are filled. In a preferred embodiment, step 256 is commenced after the first FIFO 162 is filled, when at least one item is provided to the second FIFO 164 of the stage. However, if fewer items are provided for sorting, then step 256 may start earlier. Thus, delays in providing items to the next stage in the system 150 are reduced. In addition, step 256 can refill and empty a stage 160 concurrently, allowing for the pipeline of the system 150 to remain full.

Steps 252 to 256 are then repeated, via step 258, to allow the all of the items to be sorted to flow through the system 150. Also in step 258, at least a portion of the items to be sorted reach the last stage 160-$m$ prior to step 260 being commenced. In a preferred embodiment, a stage is refilled in step 258 while the stage is being emptied in step 258. Consequently, the pipeline for the system 150 can remain full. The items in the final stage 160-$m$ are merged and sorted, via step 160 and output. Step 260 also preferably commences as soon as possible. For example, where greater than $2^{m-1}$*N items are to be sorted, step 260 preferably commences when the FIFO 162-1 ahas been filled and at least one item is provided to the other FIFO 164-1. Consequently, the sorted items are output by the system 150. Portions of steps 252 through 260 are preferably performed concurrently to improve the efficiency of the system 150.

Note that the system 100, shown in FIG. 3A, and the system 150, shown in FIG. 5, may sort any number of items up to $2^m$*N items. If fewer items are to be sorted, one or more of the FIFOs 112 and 114 or 152 and 164 are simply not filled. However, the flow through the system 100 or 150, respectively, remains essentially the same. Furthermore, more than one set of up to $2^m$*N items can be sorted by repeating the method 200 or 250 for the system 100 or 150, respectively. Thus, a data stream consisting of sets of up to $2^m$*N items can be sorted by the present invention.

Figure 7:
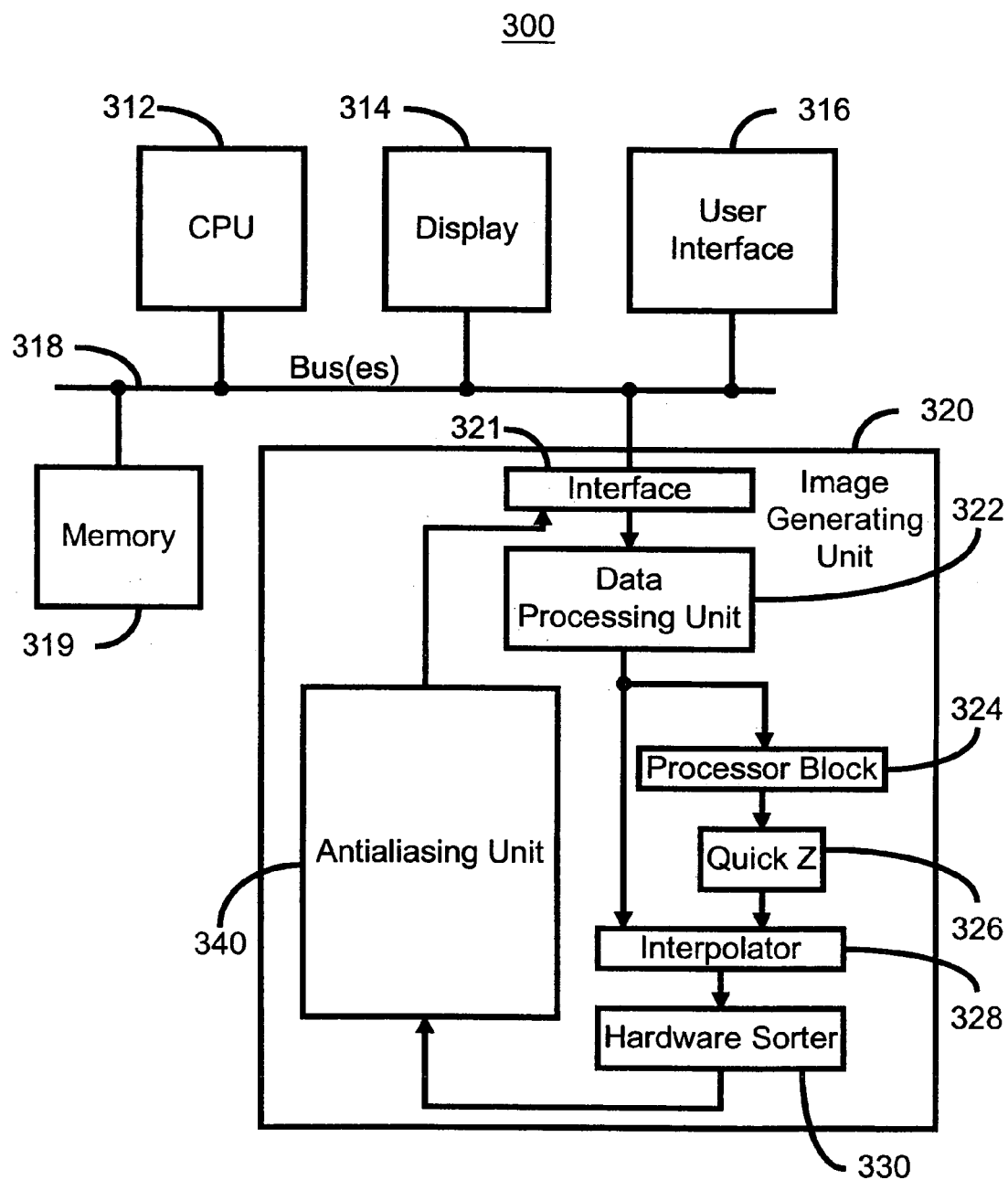
FIG. 7 depicts one embodiment of a computer graphics system in which the present invention may be utilized.

For example, the system 100 or 150 can be used in a computer graphics system. FIG. 7 depicts a high-level block diagram of such a computer-graphics system 300. In a preferred embodiment, the system 150 in accordance with the present invention is utilized in the computer graphics system 300, which renders an image pixel-by-pixel. A portion of the computer graphics system 300 is described in the above-mentioned co-pending patent application. The computer graphics system 300 includes a central processing unit (CPU) 312, a display 314, a user interface 316 such as a keyboard or mouse or other communicating device, a memory 319, and an image generating unit 320 coupled with one or more buses 318. The display 314 includes a display, such as a monitor (not explicitly shown) that includes a plurality of pixels. The display 314 could include a display memory (not shown) to which pixels are written. In order to display graphical images, the objects are broken into polygons to be used in rendering the objects. In a preferred embodiment, the polygons are rendered in raster order. That is, portions of the polygons are rendered pixel by pixel in the order of the pixels in the display 314.

The image generating unit 320 is used in rendering the graphical image. The image generating unit 320 includes an interface 321 connected to the bus 318. The interface 321 transmits data to a data processing unit 322. The processor block 324 identifies data describing portions of polygons ("intersecting polygons") which intersect the area extending along a z-axis from a selected pixel in an x-y plane corresponding to a screen of the display 314. The processor block 324 may include a number of processors, allowing intersecting polygons to be processed in parallel. The processor block 324 thus provides and indication of the fragments that intersect a pixel currently being processed. In a preferred embodiment, a large number of processors, for example up to around one thousand, are used. The methods 200 and 250 and systems 100 and 150, respectively, in accordance with the present invention aid in rendering an image processed using such a large number of processors. An obstructed object identifier/removal unit (Quick Z) 326 receives at least a portion of the fragment from each intersecting polygon associated with the selected pixel and removes portions of the fragments for intersecting polygons that are obstructed.

The interpolator 328 receives the remaining fragments for the intersecting polygons for the selected pixel and interpolates the data, including interpolating texture, color, and alpha values for the fragment. The interpolator 328 also provides a coverage mask for each fragment. The coverage mask indicates the portion of the pixel that the fragment covers. The fragments for remaining intersecting polygons are provided by the interpolator 328 to a hardware sorter 330, which is preferably the system 150. The system 150 sorts the fragments for the intersecting polygons based on the value of a key such as the z value, or depth value, for the fragment. Thus, in the system 300, the items being sorted are the fragments and the key is preferably the z-value. The hardware sorter 330 can also be the system 100. An antialiasing unit 340 performs antialiasing using the mask provided by the interpolator 328.

In order to allow the system 150 to function, additional data is provided with each fragment. Each fragment also includes a label. The label indicates the fragment's position. For example, referring to FIGS. 5 and 7, a pixel may include any number of fragments. However, the initial sorter 152 only sorts groups including up to N fragments. Consequently, the last fragment in a group of N fragments is desired to be differentiated is from the last fragment for the pixel. Consequently, a fragment which is neither the last fragment in a group of N fragments, nor the last fragment for the pixel is given a label N (next). A fragment which is the last fragment in a group of N fragments is given the label LG (last in group). The last fragment for a pixel is given the label LP (last in the pixel). In addition, a label E (empty) can be provided to fill gaps where a group has zero items. Thus, if a pixel contains less than or equal to N fragments, only one group of fragments, ending with a fragment having a label LP, is sorted by the initial sorter 152 and, therefore, by the system 150. If, however, more than N fragments are to be sorted by the system 150, then groups of N fragments will be sorted by the initial sorter 152 and passed through the system 150, being sorted as the groups pass through the system 150. The last fragment in each group, except the last group, will have a label LG. Consequently, the distributor 154 knows to alternate FIFOs 162-1 and 164-1 after each pixel having a label LG. The last fragment in the last group will have a label LP. The distributor 154 has sufficient intelligence to understand that a label of LG means that the next fragment received, if any, should go to a particular FIFO, such as the FIFO 112-1. Other fragments in the groups will be labeled N. The merge/sort switches 170 resort the groups of fragments from a stage and provide the groups of fragments alternatively to FIFOs in the next stage, preferably based on the LG and LP labels. For example, the merge/sort switch 170-1 may contain sufficient intelligence to realize that when two fragments having LG labels or a fragment having an LG label and a fragment having an LP label have been received, the next fragment should be provided to a particular (e.g. another) FIFO 162-2 or 164-2. Consequently, the system 150 can sort any number of fragments up through $2^m * N$ fragments.

Figure 2:
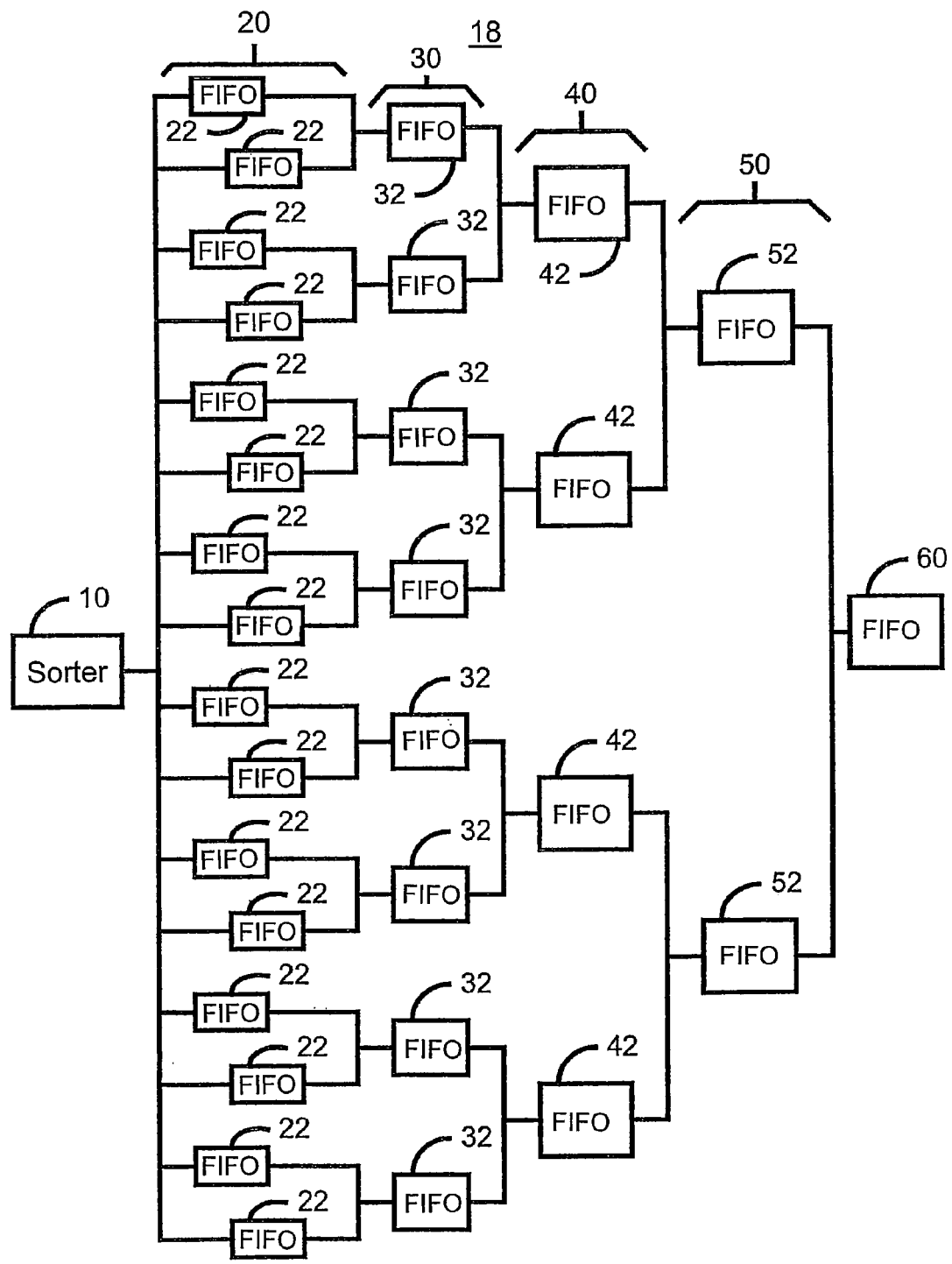
FIG. 2 is a block diagram of a conventional system for sorting a larger number of items.

The systems 100 and 150 provide a more efficient mechanism for performing a Is hardware sort. Because the size of the FIFOs 112, 114, 162 and 164 start at N, grow exponentially (by $2^i$ for stage i-1) and only require two FIFOs 112 and 114 or 162 and 164 per stage, the FIFOs 112, 114, 162 and 164 can be implemented more efficiently than for a conventional tree of FIFOs, such as the tree 20 depicted in FIG. 2. Furthermore, use of the system 100 or 150 using an initial sort in conjunction with FIFOs 112, 114, 162 and 164 that grow rapidly in size is more efficient that utilizing multiple hardware sorters 10 in parallel. Consequently, the present invention provides a more efficient mechanism for performing a hardware sort of a relatively large number of items. Moreover, the merge/sort switches 120 and 170 and the last merge/sort switch 130 and 180 can begin the merge/sort prior to the previous stage 110 or 160, respectively, being filled. Consequently, the use of additional memory in the systems 100 and 150 can be avoided. Furthermore, refilling and emptying of a stage 110 or 160 in the system 100 or 150, respectively, allows the pipelines for the systems 100 or 150 to remain full. Thus, the systems 100 and 150 have increased efficiency. The present invention is also particularly suited for use in a computer graphics systems, particularly a computer-graphics system which renders an image pixel-by-pixel.

A method and system has been disclosed for an efficient hardware sort. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A system for sorting a number of items in a computer system, the sort being based on a plurality of values of a key, each item having a value of the plurality of values, the system comprising:

a plurality of stages, each stage having first and second first-in-first-out buffers (FIFOs), the FIFOs in each stage storing twice as many of the items as the FIFOs in a previous stage of the plurality of stages;

at least one switch, each of the at least one switch coupled between two successive stages of the plurality of stages, each switch operable to merge and sort items stored in the pair of FIFOs in the previous stage based on the key to produce a sorted set of items, each of the at least one switch operable to provide successive sets of sorted items alternately to the first and second FIFOs in the next stage; and a final switch coupled to a last stage of the plurality of stages, the final switch operable to merge and sort the items stored in the pair of FIFOs in the last stage to provide the number of items in order.

2. The system of claim 1 further comprising:

a distributor coupled to a first stage of the plurality of stages, the distributor providing sets of items alternately to the first and second FIFOs in the first stage.

3. The system of claim 2 further comprising:

an initial sorter coupled to the distributor, the initial sorter operable to sort the sets of items to be provided to the first stage.

4. The system of claim 3 wherein the distributor is operable to provide sets of N items alternately to the first and second FIFOs in the first stage, and wherein each FIFO in an $i^{th}$ stage of the plurality of stages is operable to store $2^{(i-1)} * N$ items.

5. The system of claim 3 wherein the initial sorter is a hardware sorter.

6. The system of claim 5 wherein the hardware sorter includes:

a plurality of sort cells for sorting the sets of items to be provided to the first stage, each sort cell for sorting a corresponding item, the corresponding item having a corresponding value, each sort cell further having an associated key storage for storing the corresponding value, a comparator for comparing the corresponding value to a new value associated with a new item, a first input, and an output, the first input of the each of the plurality of sort cells except a first sort cell being coupled with the output of a previous sort cell; and a second input coupled with each of the plurality of sort cells, the second input for providing the new item to the plurality of sort cells;

such that each of the plurality of sort cells compares the new value to the corresponding value to determine whether to retain the corresponding item and retains the corresponding item if it is determined that the corresponding item is to be retained; and such that each of the plurality of sort cells accepts either the new item or an item corresponding to the previous sort cell if the corresponding item is not to be retained and provides the corresponding item over the output if the corresponding item is not retained.

7. The system of claim 1 wherein the computer system further includes a display having a plurality of pixels and wherein the number of items include the number of fragments intersecting a pixel of the plurality of pixels.

8. The system of claim 7 wherein each of the number of fragments include a label indicating a place in the number of fragments.

9. The system of claim 8 wherein the label indicates that a fragment of the number of fragments is a next fragment in the number of fragments, a last fragment in the number of fragments, or a last fragment for the pixel.

10. The system of claim 9 wherein the label indicates if the fragment is a last fragment of a portion of the plurality of fragments stored in a FIFO of the pair of FIFOs in a first stage of the plurality of stages.

11. A method for sorting a number of items in a computer system, the sort being based on a plurality of values of a key, each item having a value of the plurality of values, the system comprising the steps of:
(a) providing sorted sets of items alternately to a first first-in-first-out buffer (FIFO) and a second FIFO of a pair of FIFOs in a stage of a plurality of stages, each of the plurality of stages having a pair of FIFOs, the pair of FIFOs in a stage of the plurality of stages storing twice as many of the items as the pair of FIFOs in a previous stage of the plurality of stages;
(b) merging and sorting the of items from the pair of FIFOs in the stage based on the key;
(c) repeating steps (a) through (b) through a last stage of the plurality of stages; and
(d) merging and sorting the number of items to provide the number of items from the last stage of the plurality of stages.

12. The method of claim 11 further comprising the step of:
(e) initially sorting sets of items prior to providing the sorted sets of items alternately to the first second FIFOs in the first stage of the plurality of stages.

13. The method of claim 12 wherein sets of N items are alternately provided to the first and second FIFOs in the first stage of the plurality of stages, and wherein each FIFO in an $i^{th}$ stage of the plurality of stages is operable to store $2^{(i-1)}*N$ items.

14. The method of claim 12 wherein the initial sorting step (e) is performed by a hardware sorter.

15. The method of claim 14 wherein the hardware sorter includes:
a plurality of sort cells for sorting sets of items to be provided to the first stage, each sort cell for sorting a corresponding item, the corresponding item having a corresponding value, each sort cell further having an associated key storage for storing the corresponding value, a comparator for comparing the corresponding value to a new value associated with a new item, a first input, and an output, the first input of the each of the plurality of sort cells except a first sort cell being coupled with the output of a previous sort cell; and
a second input coupled with each of the plurality of sort cells, the second input for providing the new item to the plurality of sort cells;
such that each of the plurality of sort cells compares the new value to the corresponding value to determine whether to retain the corresponding item and retains the corresponding item if it is determined that the corresponding item is to be retained; and
such that each of the plurality of sort cells accepts either the new item or an item corresponding to the previous sort cell if the corresponding item is not to be retained and provides the corresponding item over the output if the corresponding item is not retained.

16. The method of claim 11 wherein the computer system further includes a display having a plurality of pixels and wherein the number of items include the number of fragments intersecting a pixel of the plurality of pixels.

17. The method of claim 16 wherein each of the number of fragments include a label indicating a place in the number of fragments.

18. The method of claim 17 wherein the label indicates that a fragment of the number of fragments is a next fragment in the number of fragments, a last fragment in the number of fragments, or a last fragment for the pixel.

19. The method of claim 18 wherein the label also indicates if the fragment is a last fragment of a portion of the plurality of fragments stored in a FIFO of the pair of FIFOs in a first stage of the plurality of stages.

* * * * *